US012716807B2

(12) United States Patent
Dau et al.

(10) Patent No.: US 12,716,807 B2
(45) Date of Patent: Aug. 25, 2026

(54) SYSTEM AND METHOD FOR INSPECTING MOLD DEFECTS IN WET OPHTHALMIC LENSES

(71) Applicant: EMAGE VISION PTE. LTD., Singapore (SG)

(72) Inventors: Sy Hieu Dau, Singapore (SG); Jia Yaw Tan, Singapore (SG); Hoang Bao Nguyen, Singapore (SG); Quang My Han Doan, Singapore (SG)

(73) Assignee: EMAGE VISION PTE. LTD., Singapore (SG)

(*) Notice: Subject to any disclaimer, the term of this patent is extended or adjusted under 35 U.S.C. 154(b) by 167 days.

(21) Appl. No.: 18/473,010

(22) Filed: Sep. 22, 2023

(65) Prior Publication Data

US 2024/0102884 A1 Mar. 28, 2024

(30) Foreign Application Priority Data

Sep. 23, 2022 (SG) .......................... 10202251131V

(51) Int. Cl.
*G01M 11/02* (2006.01)
*G06T 7/00* (2017.01)
(Continued)

(52) U.S. Cl.
CPC .... *G01M 11/0214* (2013.01); *G01M 11/0278* (2013.01); *G06T 7/0004* (2013.01);
(Continued)

(58) Field of Classification Search
CPC .......... G01M 11/0214; G01M 11/0278; G06T 7/0004; G06T 2207/10152;
(Continued)

(56) References Cited

U.S. PATENT DOCUMENTS 6,118,528 A * 9/2000 Yanagi ............... G01M 11/0214 356/124
10,489,901 B2 * 11/2019 Wong ................ G01N 21/8851
(Continued)

FOREIGN PATENT DOCUMENTS

CN 104792799 A 7/2015
JP 2022064881 A 1/1994
(Continued)

OTHER PUBLICATIONS

Taiwanese Office Action received for TW Application No. 112136413 on Oct. 18, 2014, 28 pgs.
(Continued)

*Primary Examiner* — Richard A Hansell, Jr.
(74) *Attorney, Agent, or Firm* — Merchant & Gould P.C.

(57) ABSTRACT

A system for identifying defects and measuring geometric dimensions in cosmetic ophthalmic lens immersed in a Saline solution, the system, comprising: a) at least one camera for obtaining images of the cosmetic ophthalmic lens, the camera having an optical axis; b) at least one electronically controlled illumination module designed with Visible and infrared LEDs, segmented accordingly and suitably integrated to be positioned along the vertical optical axis for directing light at different angles of the cosmetic ophthalmic lens; c) a customised glass cuvette designed with concave, concentric and spherical surfaces to avoid adding more optical power to the cosmetic ophthalmic lens under inspection and with the radius of the interior surface of the cuvette designed to be bigger than the lens to enable locating the cosmetic ophthalmic lens to the centre of the cuvette during inspection; d) a strobe controller integrated to the illumination module and Camera that is capable of capturing multiple images in quick succession under different lighting conditions, utilising Visible LED and Infrared LED segments; (e) image processing means for capturing, processing
(Continued)

and analysing multiple images to determine if the cosmetic ophthalmic lens is acceptable or rejected.

9 Claims, 7 Drawing Sheets

(51) Int. Cl.
*H04N 23/56* (2023.01)
*H04N 23/95* (2023.01)

(52) U.S. Cl.
CPC ............. *H04N 23/56* (2023.01); *H04N 23/95* (2023.01); *G06T 2207/10152* (2013.01); *G06T 2207/30108* (2013.01)

(58) Field of Classification Search
CPC .......... G06T 2207/30108; H04N 23/56; H04N 23/95; G01N 21/958; G01N 21/01; G01N 21/41; G01N 21/8806; G01N 21/8851; G01N 2021/9583; G01N 2021/8809; G01N 2021/8822; G01N 2021/8887; G01B 11/00
See application file for complete search history.

(56) References Cited

U.S. PATENT DOCUMENTS

2016/0054195 A1* 2/2016 Greivenkamp, Jr. ........................ G01M 11/0214 356/497
2016/0363506 A1* 12/2016 Escalier ............ G01M 11/0278
2017/0011507 A1 1/2017 Wong et al.
2018/0232876 A1* 8/2018 Tan .......................... G02C 7/04
2018/0252615 A1* 9/2018 Greivenkamp, Jr. ........................ G01M 11/0271
2018/0372639 A1* 12/2018 Riley ................. G01N 21/6452
2019/0323920 A1* 10/2019 Smorgon ........... G01M 11/0214
2020/0051233 A1* 2/2020 Etzold .................... G01N 21/95
2022/0090983 A1* 3/2022 Mellado ............... G01N 21/958
2025/0172500 A1* 5/2025 Jung .................. G01N 21/6452

FOREIGN PATENT DOCUMENTS

JP 2007040783 A 2/2007
JP 2013538350 A 10/2013
JP 2015138031 A 7/2015
JP 2016540994 A 12/2016
KR 1020150086633 A 7/2015
KR 1020160094372 A 8/2016
KR 1020220106774 * 8/2022
TW 201522933 A 6/2015
TW 201534886 A 9/2015
WO 2012030981 A1 3/2012
WO 2015053712 A1 4/2015

OTHER PUBLICATIONS

Japanese Office Action received for JP Application No. 2023-160223 on Sep. 24, 2024, 10 pgs.
Japanese Office Action received for JP Application No. 2023-160223 on May 1, 2025, 16 pgs.

* cited by examiner

SYSTEM AND METHOD FOR INSPECTING MOLD DEFECTS IN WET OPHTHALMIC LENSES

CROSS-REFERENCE TO RELATED APPLICATIONS

This application claims the benefit of priority to application No. SG10202251131V, filed Sep. 23, 2022 in Singapore, the entire disclosure of which is incorporated herein by reference.

FIELD OF THE INVENTION

The present invention relates to a system and method for inspection of ophthalmic lenses suspended in saline solution in a cuvette or lens holder. More specifically, the present invention relates to a system and method to detect molding defects of contact lenses located in a concave cuvette fabricated with glass material and suspended in a saline solution.

BACKGROUND OF THE INVENTION

"Contact Lens or Ophthalmic Lens" refers to a flexible lens that can be placed on or within a wearer's eye. A contact lens can correct, improve, or alter a user's eyesight, but that need not be the case. A contact lens can also add a cosmetic feature based on the type of colour and design that is printed on the anterior or otherwise referred to as the convex side of the lens. Cosmetic features may be applied in many forms. One commonly used method is the printing of such designs using an approved and appropriate material on soft lens, hard lens, or a hybrid lens. A contact lens can be in a dry state or a wet state. 'Dry State' refers to a soft lens in a state prior to hydration or the state of a hard lens under storage or use conditions. "Wet State" refers to a soft lens in a hydrated state. The front or anterior surface of a contact lens, refers to the surface of the lens that faces away from the eye when applied and the anterior surface, which is typically substantially convex, may also be referred to as the front curve of the lens. The rear or posterior surface of a contact lens, refers to the surface of the lens that contacts the eye surface. The rear surface, which is typically substantially concave, may also be referred to as the base curve of the lens. A coloured contact lens, refers to a contact lens (hard or soft) having a colour image printed on the anterior surface or one that has a tinted colour. A printed colour lens can consist of a cosmetic pattern, for example, iris-like patterns, made-to-order (MTO) patterns, and the like. A cosmetic contact lens can be produced by printing a high-quality colour image directly on the anterior surface of the contact lens, layer by layer or in one go. To begin with a contact lens can be clear before it is printed upon or alternatively, a contact lens can be tinted prior to being printed upon. It is important to note that any cosmetic feature in a contact lens applied around the IRIS. The centre area which is referred to as IRIS is usually clear and transparent. The methodology of printing will not be discussed as it is beyond the scope of this invention.

Ophthalmic lenses or contact lenses are produced by cast molding, a process to form contact lens in a concave shaped cavity between an anterior (outside) mold and a posterior (inside) mold part of a contact lens assembly. The monomer is added into the posterior mold and it is then capped with anterior mold, forming a curved shape of the lens following the profile of the concave shaped cavity. Then polymerization is initiated by ultraviolet light after which the lens is hydrated. Lens mold is fabricated with a high degree of precision because any imperfections will affect the quality of the end product. There are many other process related parameters that can also affect the quality of the contact lens. In addition to tear, scratches and aberrations there are other critical defects, wherein bubbles of air get trapped inside the lens. All these defects can be immensely difficult to detect especially in cosmetic contact lenses after patterns are printed. Such products result in medically unfit lenses for use on the eyes due to the possibility of infection and other related problems.

In the manufacturing process of ophthalmic lenses it is common knowledge that mass production of lenses involves a molding process which not only increases productivity but ensures process efficiency and quality. However due to the nature of the manufacturing process, defects can occur during molding, cutting and separation processes of the lenses. Ophthalmic lenses, in particular daily soft contact lenses, are intended for use in the human eye not just to correct the vision but also for cosmetic reasons with attractive patterns printed on them. The printed patterns can also camouflage critical defects embedded in the lens thus making automated quality inspection much harder and requiring the implementation of special illumination, optical setup and intelligent algorithms. As Ophthalmic lenses are manufactured in high volumes, manual or even sampling inspection is not an option for manufacturers.

Prior art addresses some of these concerns by implementing inspection systems at the final packaging stage which can be too late to prevent more defects from being produced. The significant losses resulting in late stage detection of defects has resulted in manufacturers demanding inspection systems to be incorporated immediately after the molding process where mold defects are generated so that appropriate measures can be taken to solve the problem and minimise production of defective lenses.

In one other prior art, images acquired at different rotary angles of the Contact lens are compared to detect issues within the lens suspended in a cuvette filled with saline solution. A trait or feature that moves in accordance with the angle of rotation of the lens is identified as a reject and accordingly sorted. This method, though effective, is time consuming and complex as it involves moving the lens around mechanically or otherwise, making them unfit for inline inspection systems.

Several other prior art defect inspection methods for lens exist. However, they utilise multiple LED illumination modules to capture brightfield and darkfield images which are not optimised for mold defects. Such inspection systems are limited in detecting mold defects (deformities) within the body of the ophthalmic lens suspended in saline solution. In addition they result in complex setup procedures and configuration processes during product changeovers which make them inflexible and unscalable.

Another commonly used inspection method is to use microscopes to check lenses manually. However, this kind of apparatus is ill-suited for mass production. Random sampling is another option that several manufacturers use, but the risk of defects reaching the customer is high making this option unreliable.

In a typical process of contact lens inspection, the process is usually carried out further down the line, at the final stage of manufacturing where lenses have their pattern printed and hydrated with saline solution. Inspection at this stage of the process also involves taking into account the refractive index and optical absorption into consideration when analysing the images, resulting in increased complexity. More importantly, if a mold defect is detected at the final stage of the process, the delayed flagging also results in significant loss of material to the manufacturer.

The principal challenge when inspecting ophthalmic lenses is to perform the inspection after their hydration at the end of the molding process. If the inspection is carried out immediately after the molding process, any problems or defects detected can be quickly analysed and solved, to reduce the amount of defective ophthalmic lenses produced. Therefore there is a need for an apparatus that is accurate, repeatable and consistent in detecting molding deformities in cosmetic ophthalmic lenses which is easy to integrate into an existing automated manufacture line. This is the objective of the present invention.

SUMMARY OF THE INVENTION

The present invention provides a system & method for the automatic inspection of cosmetic contact lenses after the molding process, in a lens manufacturing system. The system comprises the use of a dark-field imaging that utilises an Infrared LED based Illumination module to highlight deformities in an ophthalmic lens suspended in a Cuvette filled with Saline Solution.

It is an object of the present invention to provide a system that comprises a monochrome high-resolution camera, a customized optical module, a glass based cuvette designed to precisely locate the contact lens when suspended in Saline Solution, an Infrared LED based illumination module to illuminate the contact lens and an image processing computer capable of capturing high resolution images and processing them for deformities within a cosmetic contact lens. Fundamentally, while different refraction index affects the angle of refraction of the same wavelength, different wavelengths also affect the angle of refraction of the same index. When the contact lens is illuminated with Visible LED based lighting, due to the narrow angle of view of the imaging lens, it is therefore possible that not all of refracted light passes through the lens, leading to some of the defects not being highlighted. The Infrared LED based illumination at longer wavelengths have lower saline's refractive index and lower contact lens material's optical absorption compared to illumination using Visible LED lighting. Therefore, Infrared LED based lighting can pass through a pattern printed contact lens and refract light at deformities inside the lens with lower angle resulting in enhanced defect detection and consistent inspection accuracy and repeatability.

It is further an object of the present invention to provide an apparatus and method to utilize the longer wavelength (980 mm) infrared illumination that results in enhanced image acquisition of ophthalmic lens specially for mold defects and many other kind of deformities that affects the homogeneous characteristic in both optical zone and pattern zone.

It is further an object of the present invention to provide an apparatus that is integrated with an Infrared LED based illumination module designed that is electronically controlled to emit light at a programmed pulse width at selected intensity and preselected segments of LEDs.

It is further an object of the present invention to provide an apparatus that is integrated with IR LED based illumination module enabled for creating recipe files for different devices during setup and configuration that may contain parameters for LED intensity, trigger pulse width, delay for trigger, Illumination module segment selection, position of illumination module from the object amongst others.

It is further an object of the present invention to provide an apparatus that is integrated with an IR LED based illumination module, to measure the intensity of Illumination for maintaining a consistent and stable luminance of light on the object under inspection, through current control of the intensity controller.

It is further an object, of the present invention to provide an apparatus wherein each model of lens is paired with a customised glass cuvette profile that follows the anterior profile of the lens when suspended in the saline solution to achieve optimum and enhanced illumination to highlight mold defects.

It is yet another aspect of the present invention to provide an apparatus for use as an inline inspection module that is easily integrated into an automated contact lens manufacturing system.

Other features and objects of the present invention will become apparent from the detailed description of the preferred embodiment(s) as well as the drawing figures included herein below.

BRIEF DESCRIPTION OF THE DRAWINGS

The present invention might be understood by the further description in respect of following detailed description together with the accompanying drawings. Consequently, the particularity of the accompanying drawings is not to be understood as superseding the generality of the preceding description of the invention.

DETAILED DESCRIPTION OF THE INVENTION

Unless defined otherwise, all technical and scientific terms used herein have the same meaning as commonly understood by one of ordinary skills in the art to which this invention disclosed herein belongs. Generally, the nomenclature used herein are well known and commonly employed in the art. Conventional methods are used for these procedures, such as those provided in the art and various general references. Where a term is provided in the singular, the inventors also contemplate the plural of that term.

Figure 1:
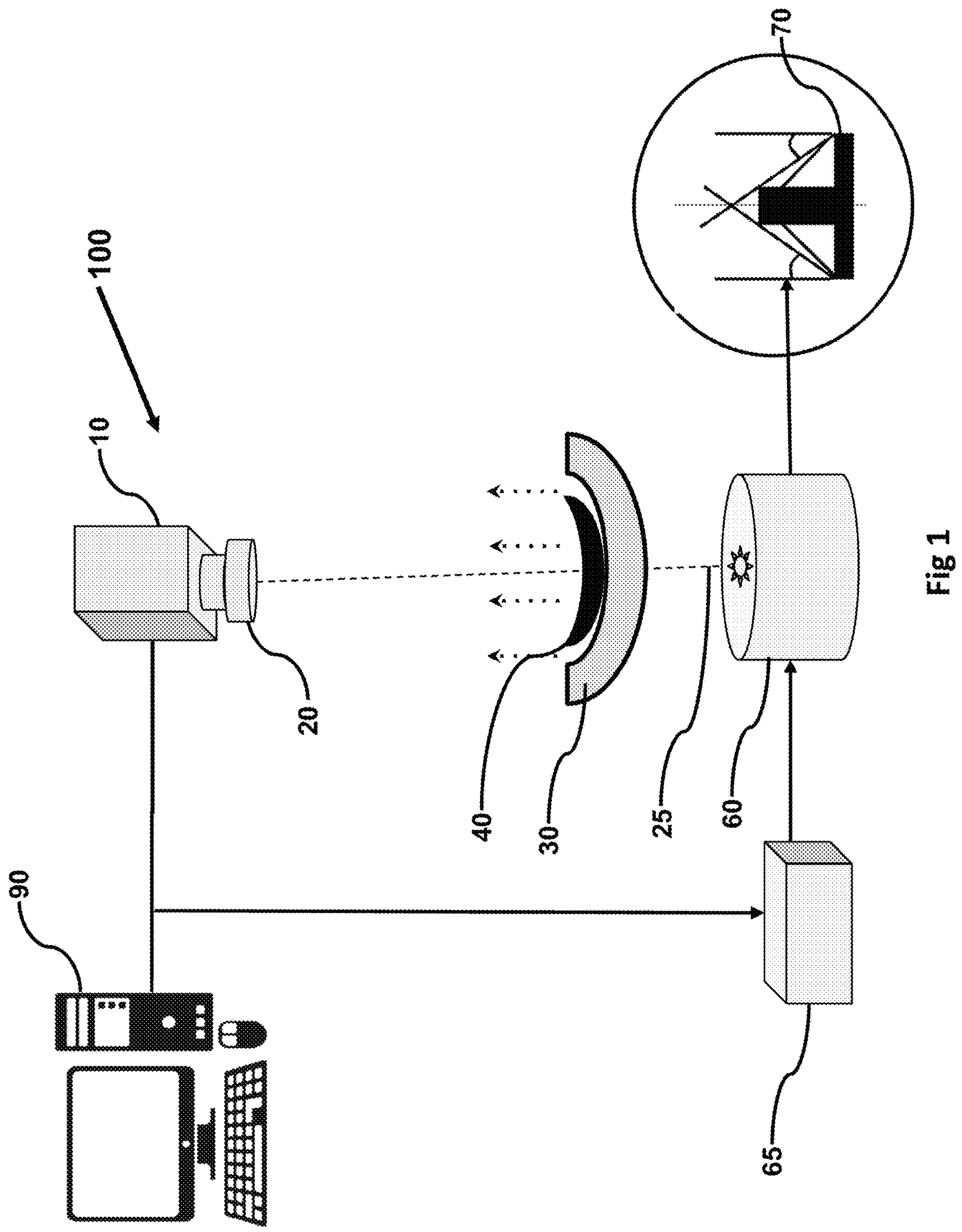
FIG. 1 shows a preferred embodiment of the invention. The apparatus 100 comprises an image processing computer 90 electronically integrated to a high-resolution Camera 10 and an Illumination strobe controller 65 connected to the Illumination module 60. The Camera 10 is mounted with an optical lens 20, to view the Ophthalmic lens 40 suspended in glass cuvette with saline solution 30 The LED based illumination module 60 directs the illumination towards the contact lens 40. The Camera, Cuvette and Illumination are suitably aligned with the optical axis 25. The illumination module 60 is connected to a programmable strobing LED controller 65 to control the illumination trigger pulse width, the intensity of the LED segments and various other parameters. 70 shows the IR LEDs illumination module fabrication structure.

The preferred embodiment in FIG. 1 consists of a high-resolution camera 10 coupled with a customised optical lens 20, an illumination module 60 consisting of an infrared LED based lighting structure 70 and triggered synchronously or asynchronously with the camera shutter through a lighting control and strobing system 65, that enables control of pulse width, delayed strobing, illumination intensity and LED segment selection. The ophthalmic lens 40 under inspection is suspended in a customised glass cuvette 30 containing saline solution. The customised glass cuvette 30 is designed with concave, concentric & spherical inner and outer surfaces to avoid additional optical power due to surfaces of the cuvette. Radius of the inner surface of the cuvette is designed to be bigger than the radius of the contact lens in order to position the contact lens to the centre of the cuvette in line with the main optical axis 25. In another embodiment, the IR lighting module 60 can be constituted of a plurality of Visible and Infrared LEDs segments. Depending upon the selected LED segments in the illumination module, the user can achieve a plurality of incident angles at the contact lens to be inspected. However, the Infrared LED wavelength is suitable to bypass large refraction angles usually evident in Visible LED illumination wavelengths. For inspection on contact lenses with radius less than 15 min, the Infrared illumination ray angle be limited using a non-reflective surface structure 70 in order to keep the incident light angle with respect to cuvette surface, within 10 degrees. This angle can however be controlled by adjusting the distance from lighting, module 60 to bottom of cuvette 30. When Infrared LED based illumination is selected, the refractive index of saline is smaller when compared with Visible LED based lighting ilium nation which effectively means that the profit e of the saline solution surface won't affect the image quality. Therefore, Infrared illumination suits Mold defect inspection of clear, tinted and printed cosmetic contact lenses.

In a further embodiment of the present invention, the illumination module 60 may be controlled to emit light synchronously or asynchronously with the camera shutter, in order to reduce the power consumption required to operate LEDs as well as maintain a uniform luminance and simultaneously extend the lifespan of the LEDs. This may be accomplished by utilizing an electronic illumination strobe controller 65. The electronic illumination strobe controller enables software control of pulse width, intensity of the selected segments of LEDs, timing delay between Camera Shutter and illumination trigger depending upon the application, during the camera image acquisition process. The timing delay allows the selected LEDs segment to achieve the programmed intensity before the Camera Shutter is triggered for Image acquisition. This feature enables consistent image uniformity between several image captures which translates to optimum repeatability and accuracy during image analysis.

Various lighting using different wavelengths of LEDs could be used to help identify obscure, and non-desired elements. For example, fibers could be used to help reject, unwanted wavelengths of light and only allow the chosen wavelength. This improves the contrast between different types of defects Polarized, uniform, and non-uniform lighting conditions could be employed to help identify the defects of interest.

Figure 3:
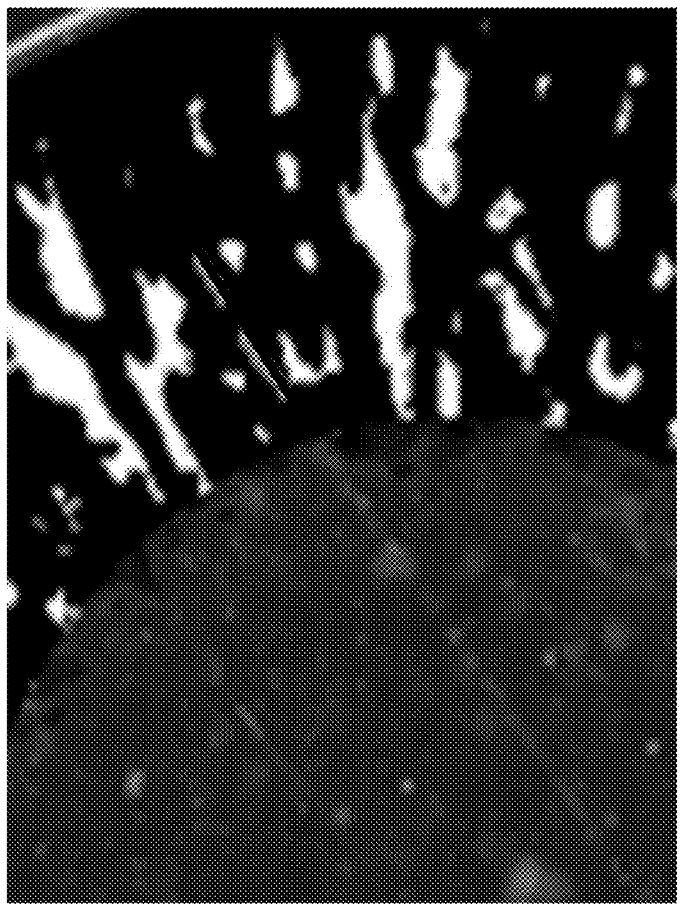
FIG. 3 shows an enlarged image of the area B1 in FIG. 2.
Figure 2:
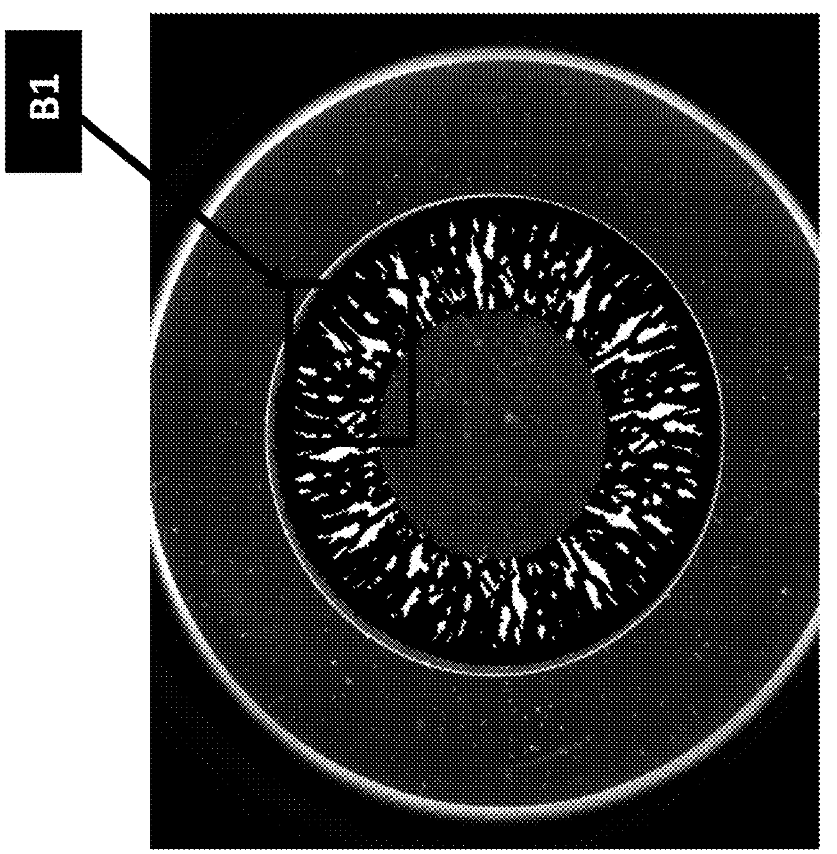
FIG. 2 shows an image captured of a defective ophthalmic lens showing a deformity B1 extending from the optical zone to pattern zone, utilising a Visible LEDs illumination module.

FIG. 2 shows an image of the ophthalmic lens captured by the system 100 in FIG. 1, using Visible LED illumination. A probable deformity in box B1 is shown. An enlarged image of the defect is shown in FIG. 3, wherein the deformity is seen as a white streak against a dark background. A significant portion is very faint against the foreground printed pattern and remains hidden. Depending upon the inspection threshold tolerance, the deformity may or may not be detected as a defect. This ambiguity may lead to an unreliable inspection result, which can be interpreted as BAD or GOOD lens.

Figure 5:
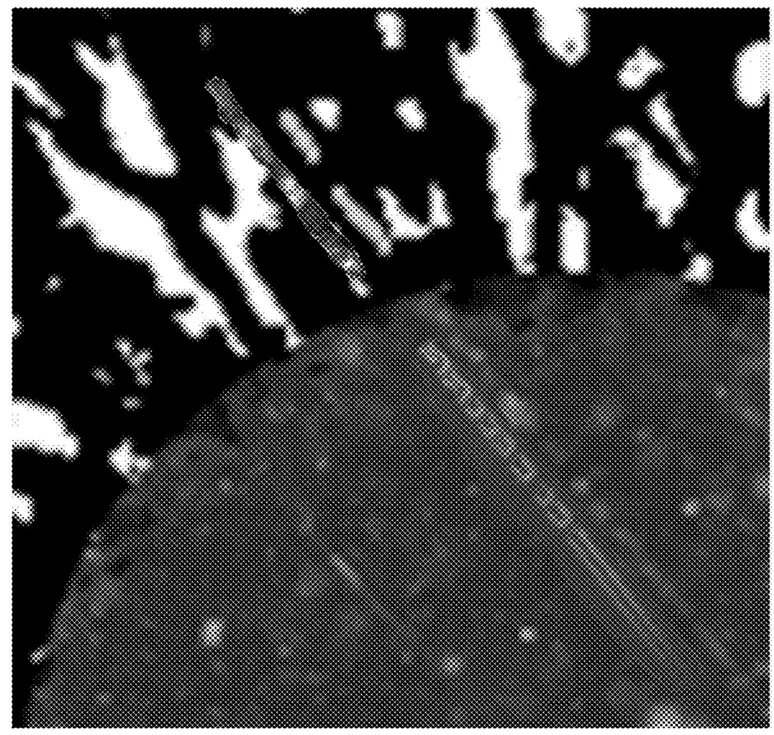
FIG. 5 shows an enlarged image of the area B2 in FIG. 4.
Figure 4:
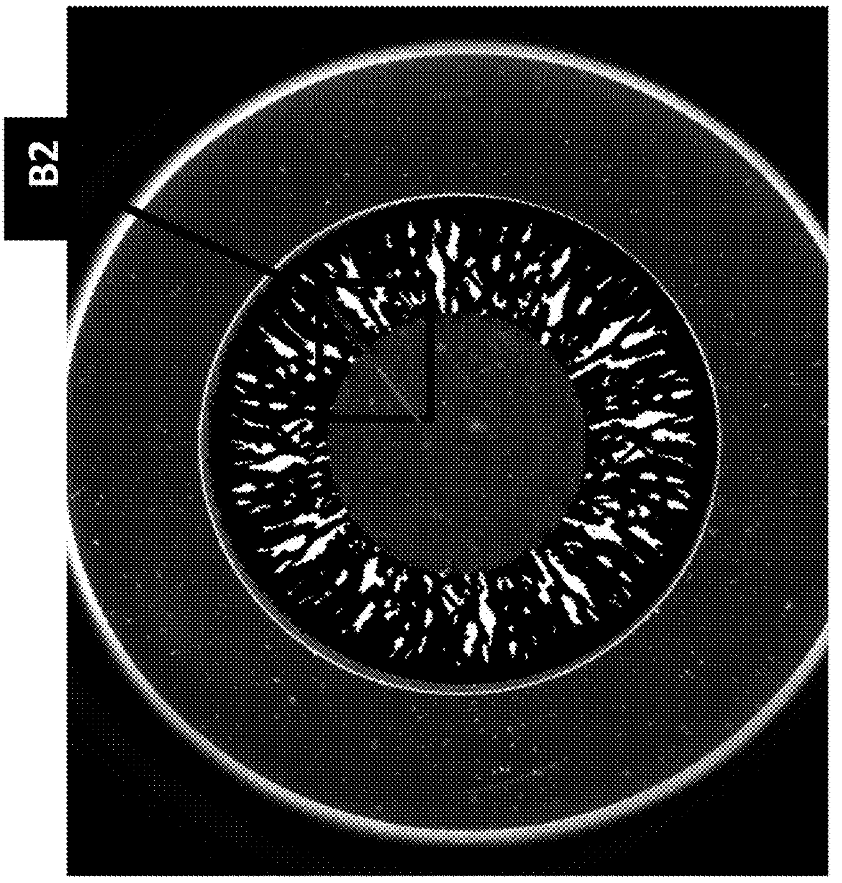
FIG. 4 shows an image captured of the same defective ophthalmic lens in FIG. 2, showing a deformity B2 extending from the optical zone to pattern zone, when utilising an Infrared LEDs illumination module.

FIG. 4 shows an image of the same ophthalmic lens in FIG. 2, captured by the system 100 in FIG. 1, using Infrared LED illumination. A probable deformity in box B2 is shown. An enlarged image of the defect is shown in FIG. 5, wherein the deformity is seen as a bright white streak extending along the clear zone of the IRIS and the printed pattern foreground. It is evident that the Infrared LED Illumination clearly outperforms the Visible LED illumination when highlighting defects under two different conditions namely, a clear and transparent zone and a printed pattern zone of the ophthalmic lens.

Figure 7:
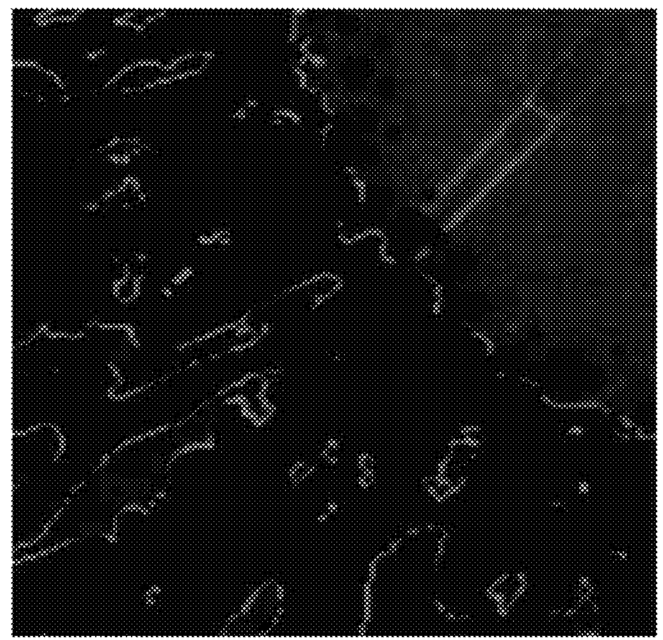
FIG. 7 shows an enlarged image of the area B3 in FIG. 6.
Figure 6:
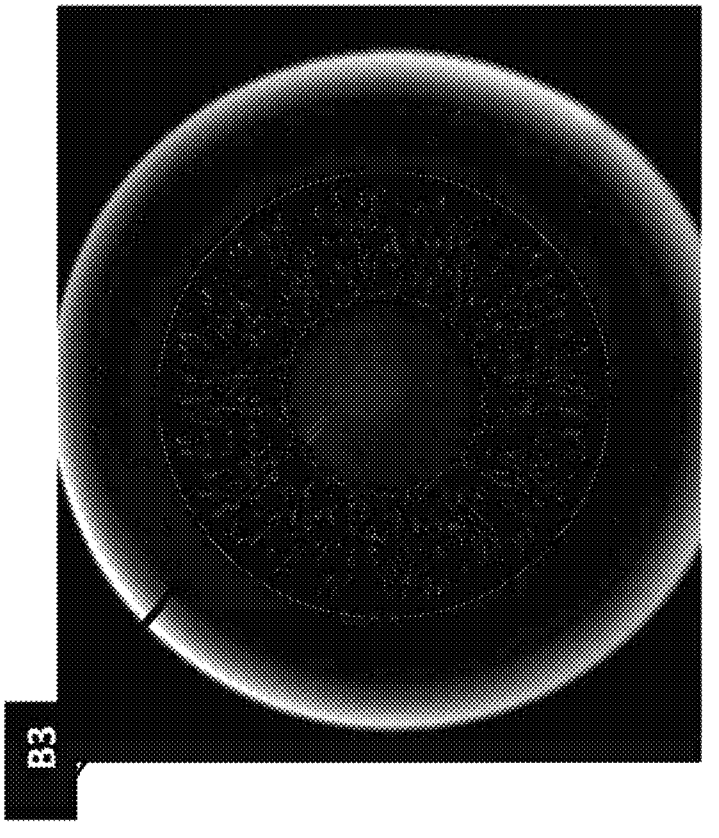
FIG. 6 shows an image captured of a defective ophthalmic lens, showing another deformity in B3 extending from the optical zone to pattern zone, utilising a Visible LEDs illumination module.

FIG. 6 shows an image of the ophthalmic lens captured by the system 100 in FIG. 1, using Visible LED illumination. A probable deformity in box B3 is shown. An enlarged image of the defect is shown in FIG. 7, wherein the deformity is seen as faint parallel white lines visible only along the clear zone of the IRIS but barely visible against the printed pattern foreground. Depending upon the inspection threshold tolerance, the deformity may or may not be detected as a defect and if detected the defect dimensions may not be accurate to reflect an accurate and consistent result. This ambiguity may lead to an unreliable inspection result, which can be interpreted as BAD or GOOD lens.

Figure 9:
FIG. 9 shows an enlarged image of the area B4 in FIG. 8.
Figure 8:
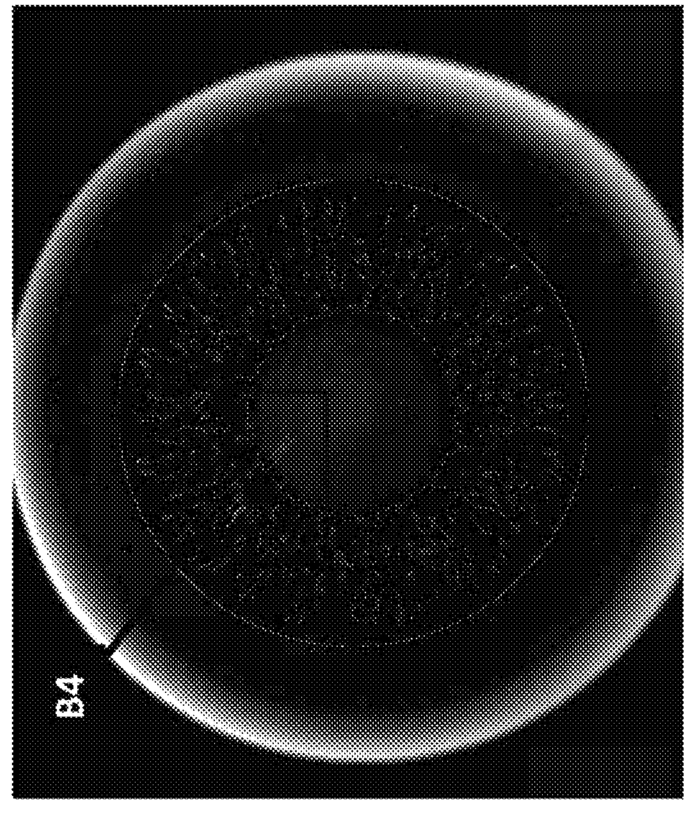
FIG. 8 shows an image captured of the same defective ophthalmic lens in FIG. 6, showing the deformity in B4 extending from the optical zone to pattern zone, when utilising an Infrared LEDs illumination module.

FIG. 8 shows an image of the same ophthalmic lens in FIG. 6, captured by the system 100 in FIG. 1, using Infrared LED illumination. A probable defect is shown in box B4. An enlarged image of the defect is shown in FIG. 9, wherein the defect is enhanced in both the clear zone and printed pattern zone. It is evident again, that the Infrared LED Illumination clearly outperforms the Visible LED illumination when highlighting very faint defects irrespective of whether they occur in the transparent zone or in the printed pattern zone of the ophthalmic lens.

Figure 11:
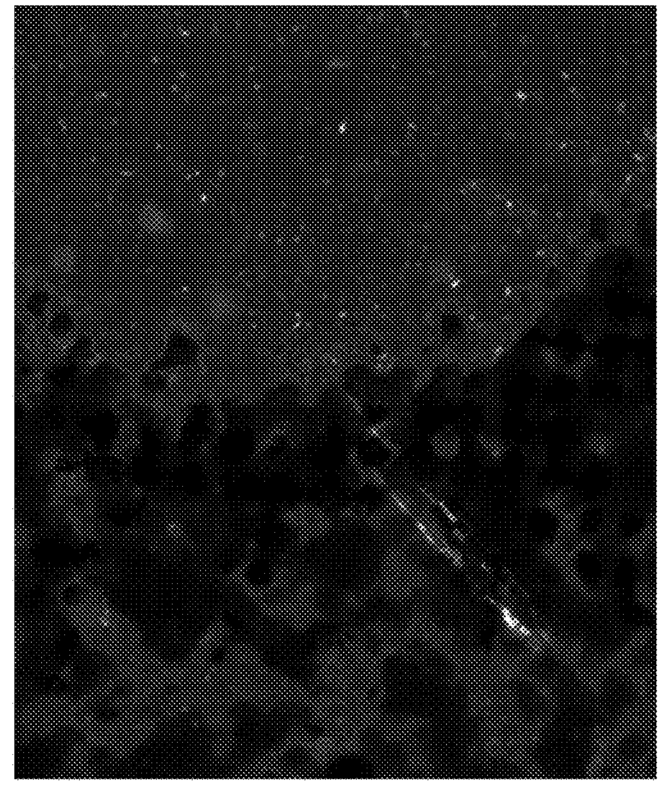
FIG. 11 shows an enlarged image of the area B5 in FIG. 10.
Figure 10:
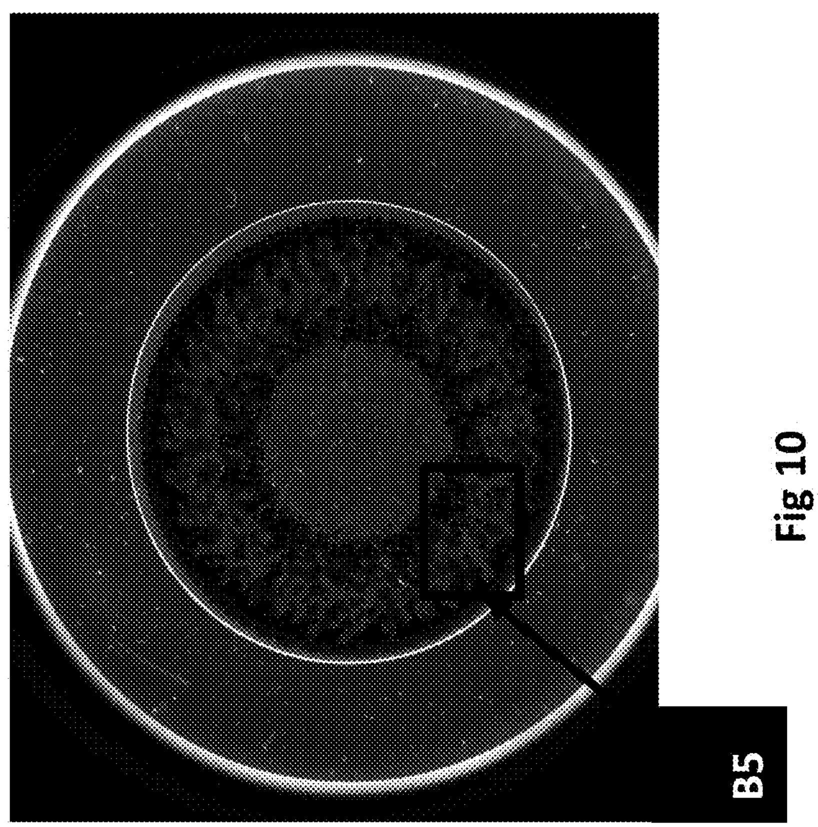
FIG. 10 shows an image captured of a defective ophthalmic lens, showing another deformity in B5 extending from the optical zone to pattern zone, utilising a Visible LEDs illumination module.

FIG. 10 shows an image of the ophthalmic lens captured by the system 100 in FIG. 1, using Visible LED illumination. A deformity in box B5 is shown. An enlarged image of the defect is shown in FIG. 11, wherein the deformity is not visible in the clear zone IRIS of the ophthalmic lens and faintly visible in the printed pattern zone. The defect will not be detected in the IRIS zone but may be detected in the pattern zone depending upon the inspection threshold tolerance. The defect dimensions may not be accurate to reflect an accurate result. This ambiguity may again lead to an unreliable inspection result.

Figure 13:
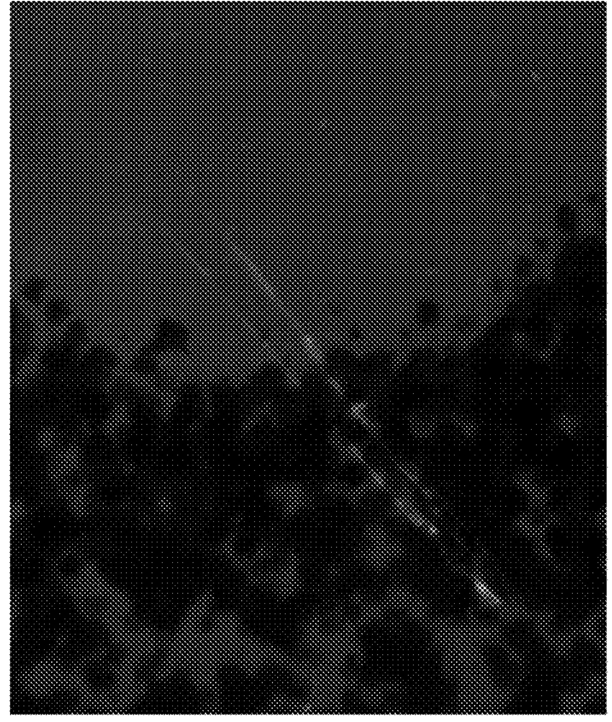
FIG. 13 shows an enlarged image of the area B6 in FIG. 12.
Figure 12:
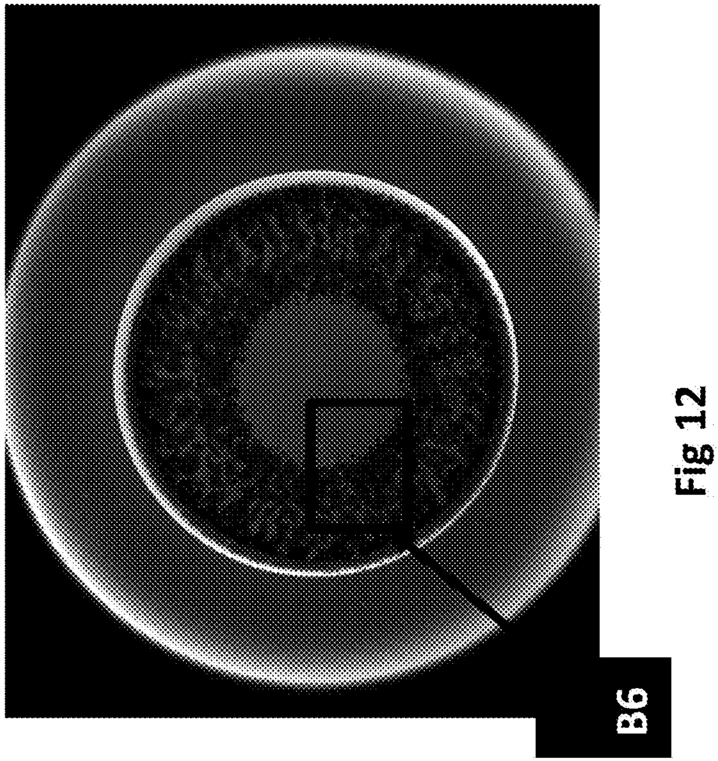
FIG. 12 shows an image captured of the same defective ophthalmic lens in FIG. 10, showing the deformity in B6 extending from the optical zone to pattern zone, when utilising an Infrared LEDs illumination module.

FIG. 12 shows an image of the same ophthalmic lens in FIG. 10, captured by the system 100 in FIG. 1, using Infrared LED illumination. Box B6 is shown as a probable defect. An enlarged image of the defect is shown in FIG. 13, wherein the defect is enhanced in both the clear zone and printed pattern zone. In fact the defect in the clear zone is very well enhanced leading to a reliable inspection process. Here again it is clearly evident that the Infrared LED Illumination clearly outperforms the Visible LED illumination when highlighting very faint defects irrespective of whether they occur in the transparent zone or in the printed pattern zone of the ophthalmic lens.

The foregoing detailed description of the embodiment(s) of the present invention is presented solely for clarity of understanding and no unnecessary limitations are to be understood or implied therefrom. Modifications to the present invention in its various embodiment(s) will become obvious to those skilled in the art upon reading this disclosure and may be made without departing from scope of the invention encompassed by the claims appended hereto. In view of the above, it will be seen that the several objects of the invention are achieved, and other advantages are Obtained. As many Changes could be made in the above constructions and methods without departing from the scope of the invention, it is intended that all matter contained in the above description shall be interpreted as illustrative and not in a limiting sense.

The invention claimed is:

1. A system for identifying defects and measuring geometric dimensions in cosmetic ophthalmic lens immersed in a saline solution, the system, comprising:

a) at least one camera for obtaining images of the cosmetic ophthalmic lens, the camera having an optical axis;

b) at least one electronically controlled illumination module designed with visible and infrared LEDs, segmented accordingly and suitably integrated to be positioned along the vertical optical axis for directing light at different angles to the cosmetic ophthalmic lens;

c) a customized glass cuvette designed with concave, concentric and spherical surfaces to avoid adding more optical power to the cosmetic ophthalmic lens under inspection and with the radius of the interior surface of the cuvette designed to be bigger than the lens to enable locating the cosmetic ophthalmic lens to the center of the cuvette during inspection;

d) a strobe controller integrated to the illumination module and camera that is capable of capturing multiple images in quick succession under different lighting conditions, utilizing visible LED and infrared LED segments; and (e) an image processing means for capturing, processing and analysing multiple images to determine if the cosmetic ophthalmic lens is acceptable or rejected;

wherein the illumination module includes a non-reflective surface structure configured to keep an incident light angle of the infrared LEDs within a predetermined angle with respect to a surface of the cuvette; and wherein infrared LED based illumination exhibits low refractive index when passing through the saline solution effectively eliminating distortions in image capture of a saline immersed cosmetic ophthalmic lens.

2. The system according to claim 1 wherein: the illumination controller is designed to control parameters including one or more of intensity of the segments, type of illumination, duration of illumination, time delay for camera shutter trigger with respect to illumination trigger pulse for image capture, to minimize power consumption.

3. The system according to claim 1 wherein: illuminated infrared LED segments in the illumination module are selected to enhance deformity defects in the cosmetic ophthalmic lens within a printed pattern area and optical zone.

4. The system according to claim 2 wherein: all configurations related to illumination module setup are programmed according to the parameters, wherein the parameters are stored in a recipe file for a particular type of cosmetic ophthalmic lens.

5. The system according to claim 1 wherein: the illumination module lighting configuration selection depends on defect type comprising tear, scratches, and air bubbles trapped within the printed area and optical zone of the cosmetic ophthalmic lens.

6. The system according to claim 1 wherein: the image processing means being further operable to analyze the obtained images to provide an indication of predetermined defects in the cosmetic ophthalmic lens.

7. A method for inspecting cosmetic ophthalmic lenses, comprising the steps of:

a) placing the lens within the customised glass cuvette with an illumination module positioned below the cuvette and a camera to capture images of the lens;

b) capturing at least one image of the lens immersed in saline solution illuminated by visible LED segments of the illumination module and at least a second image of the lens illuminated with infrared LED segments of the illumination module;

c) keeping an incident light angle of the infrared LED segments within a predetermined angle with respect to a surface of the cuvette by a non-reflective surface structure of the illumination module;

d) analyzing and determining if additional images are to be captured after processing the images and appropriately modifying illumination module parameters including one or more of trigger pulse width, intensity and segmentation along with camera shutter capture delay with respect to illumination trigger and deciding whether to choose infrared LEDs or visible LEDs or a combination of both based on the defect to be highlighted;

e) further processing the images and identifying the defect, followed by classifying and sorting the lens according to the defects, by an image processing means;

f) utilizing a low refractive index characteristic of the saline solution when illuminated with infrared LED illumination to accurately identify the position and dimension of mold defects within the printed area and optical zone of the lens.

8. The method according to claim 7 wherein: the image processing means includes recipe files for different types of cosmetic ophthalmic lens in relation to configurations comprising intensity, LED segmentation, type of illumination namely infrared or visible LEDs, position of the illumination with respect to the lens cuvette, trigger pulse timing delays between camera and illumination, and a number of images to be captured under each illumination configuration.

9. The method according to claim 7 wherein: the image processing means utilizes illumination with longer wavelength to enhance defects comprising mold defects within the printed pattern and the optical zone of the lens as the refractive index is lower at the longer wavelengths.

* * * * *